US008456713B2

(12) United States Patent
Fukuda

(10) Patent No.: US 8,456,713 B2
(45) Date of Patent: Jun. 4, 2013

(54) IMAGE COMBINING APPARATUS, CONTROL METHOD FOR IMAGE COMBINING APPARATUS, AND PROGRAM

(75) Inventor: Tatsuya Fukuda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1274 days.

(21) Appl. No.: 11/777,938

(22) Filed: Jul. 13, 2007

(65) Prior Publication Data

US 2008/0018949 A1    Jan. 24, 2008

(30) Foreign Application Priority Data

Jul. 24, 2006    (JP) ................................ 2006-200476

(51) Int. Cl.
*H04N 1/387*    (2006.01)
*H04N 1/56*    (2006.01)
*H04N 1/60*    (2006.01)
*G06T 5/00*    (2006.01)
*G06K 9/36*    (2006.01)
*G06K 9/00*    (2006.01)

(52) U.S. Cl.
USPC ........... 358/450; 358/540; 358/452; 358/537; 358/1.9; 358/3.27; 382/284; 382/167

(58) Field of Classification Search
None
See application file for complete search history.

(56) References Cited

U.S. PATENT DOCUMENTS

| | | | | |
|---|---|---|---|---|
| 6,005,972 A | * | 12/1999 | Fredlund et al. | 382/176 |
| 6,204,935 B1 | * | 3/2001 | Soma et al. | 358/448 |
| 6,711,291 B1 | * | 3/2004 | Stubler et al. | 382/195 |
| 7,262,778 B1 | * | 8/2007 | Edwards et al. | 345/589 |
| 2005/0088698 A1 | * | 4/2005 | Matama | 358/2.1 |
| 2006/0187477 A1 | * | 8/2006 | Maki et al. | 358/1.9 |

FOREIGN PATENT DOCUMENTS

| | | | |
|---|---|---|---|
| JP | 4-122991 A | | 4/1993 |
| JP | 05257439 A | * | 10/1993 |
| JP | 2004317594 A | * | 11/2004 |

* cited by examiner

*Primary Examiner* — Vincent Rudolph
*Assistant Examiner* — Peter L Cheng
(74) *Attorney, Agent, or Firm* — Canon USA Inc. IP Division

(57) ABSTRACT

When a handwritten character or hand-drawn illustration in a color desired by a user is combined with a photograph, in order to achieve an excellent combined result, characteristics of the photograph are analyzed and an appropriate combining method from among a plurality of combining methods is selected in accordance with a result of the analysis.

13 Claims, 11 Drawing Sheets

70

71

72

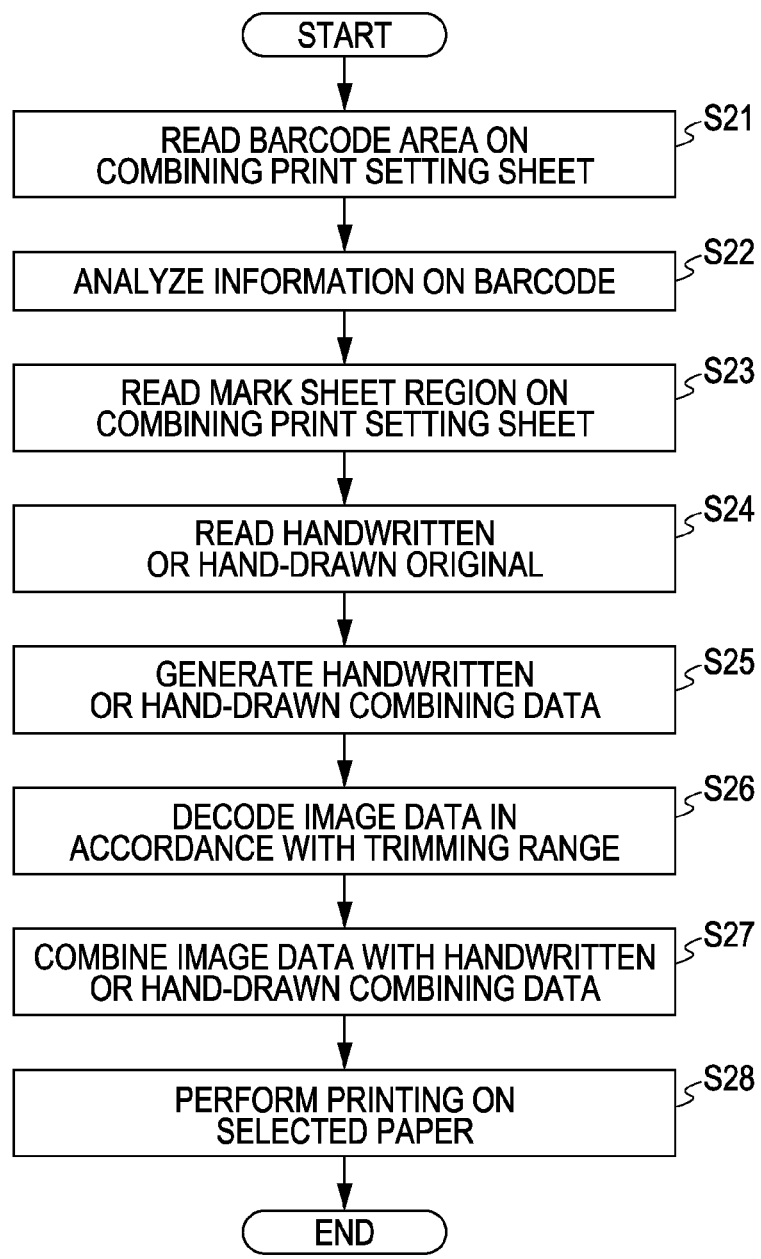

IMAGE COMBINING APPARATUS, CONTROL METHOD FOR IMAGE COMBINING APPARATUS, AND PROGRAM

BACKGROUND OF THE INVENTION

1. Field of the Invention

The present invention relates to a function of installing a storage medium in which image data captured with a digital camera is stored, reading the image data stored in the storage medium, and performing printing, and more particularly, to an image combining apparatus, an image combining method, and a program for reading a handwritten or hand-drawn original, such as a handwritten character or a hand-drawn illustration, combining the read handwritten or hand-drawn original with selected image data, and performing printing.

2. Description of the Related Art

In recent years, due to the widespread use of digital cameras, there has been an increased demand for printing (or photo-printing) of images captured with digital cameras in homes. In general, in order to print an image captured with a digital camera, a storage medium reader (hereinafter, referred to as a "memory card reader") is connected to a personal computer (hereinafter, referred to as a "PC").

A storage medium (hereinafter, referred to as a "memory card") in which the image captured with the digital camera is stored is installed in the memory card reader, and image data is transferred to the PC. The PC is connected to a printer, and printing is performed.

Examples of commercially available apparatuses allowing users who are unfamiliar with PCs to easily perform photo-printing are so-called direct printers and so-called multifunction printers (hereinafter, referred to as "MFP apparatuses") capable of providing a plurality of functions. Such apparatuses include a memory card slot into which a memory card in which images captured with digital cameras are stored is inserted. In addition, users are able to select an image to be printed and to designate the size of paper, the number of prints, and the like by operating an operation unit of the apparatuses.

In addition, in recent years, apparatuses provided with a color liquid crystal display (LCD) screen have also been commercially available. Thus, even users who are unfamiliar with PCs are able to select an image to be printed while looking at an LCD screen and to easily perform photo-printing.

In addition, in order to designate such settings for photo-printing more easily, a photo-printing method using a print setting sheet is adopted in an MFP apparatus. In photo-printing using the print setting sheet, images stored in a memory card inserted in the MFP apparatus and areas in which marking is performed for selecting corresponding images are disposed next to each other as a list on the print setting sheet, and the print setting sheet is printed. A user checks a mark on the print setting sheet that corresponds to an image to be printed. Then, the marked print setting sheet is placed on an original document plate of the MFP apparatus, and the checked mark is detected by scanning over the marked print setting sheet. Then, the image corresponding to the detected mark is printed. Accordingly, the user is able to easily print a desired image by the above-mentioned series of operations.

The above-mentioned print setting sheet has been developed to provide a handwriting or hand-drawing combining print function of combining a character handwritten or illustration hand-drawn by a user with a desired image file and performing printing of the resulting image. An area in which a character is to be handwritten or an illustration is to be hand-drawn by a user is printed on the print setting sheet providing the handwriting or hand-drawing combining print function, and a user writes a character or draws an illustration in the area. Then, the user places the print setting sheet for handwriting or hand-drawing combining printing on the original document plate of the MFP apparatus, and the print setting sheet placed on the original document plate is read. The read data in the handwriting or hand-drawing area is combined with selected image data, and the combined image of the handwritten character or hand-drawn illustration and the desired image is printed on paper selected on the basis of a mark provided on the combining print setting sheet.

As a method for combining an image with a character, a method in which combination is performed by selecting one of a plurality of combining methods has been suggested (see Japanese Patent Laid-Open No. 4-122991).

A combining printing procedure of the related art using the above-mentioned combining print setting sheet will be briefly described.

First, on the LCD screen provided on an MFP apparatus, a user selects an image to be combined and printed. Then, the user prints a combining print setting sheet. The selected image is printed as a sample on the print setting sheet, and a frame indicating an area in which a combining image is to be provided is printed next to the image (reference image) printed as the sample. The user writes a character or draws an illustration in the area on the printed combining print setting sheet in which a combining image is to be provided. The user selects the size of paper on which the combined image of the selected image and the handwritten character or hand-drawn illustration is printed by checking a mark in a mark sheet region corresponding to the size of paper. The combining print setting sheet created as described above is placed on the original document plate of the MFP apparatus, and scanning is performed over the combining print setting sheet. Thus, data corresponding to the handwritten character or hand-drawn illustration in the area for a combining image is read and combined with the selected image data, and printing of the combined image of the selected image and the handwritten character or hand-drawn illustration is performed.

In the related art described above, when a combining print setting sheet is printed and writing and combining of a handwritten character or drawing and combining of a hand-drawn illustration is performed, if, for an image with a background having a high color density, such as a night view, a handwritten character or hand-drawn illustration in a color having a high color density or a color close to the color of the image is used, the handwritten character or hand-drawn illustration is hard to see since the handwritten character or hand-drawn illustration is buried in the background. This case corresponds to, for example, a case where a handwritten character or hand-drawn illustration in navy blue is combined with a black image.

SUMMARY OF THE INVENTION

The present invention provides an image combining apparatus, an image combining method, and a program capable of achieving an excellent combined result even when a color desired by a user is used for a handwritten character or hand-drawn illustration.

According to an aspect of the present invention, there is provided an image processing apparatus that prints a sheet provided for instructing combining of a first image with a second image. The image processing apparatus includes an analyzer configured to analyze the first image; an evaluating unit configured to evaluate at least one combining method appropriate for the combining of the first image with the second image in accordance with a result of the analysis performed by the analyzer; and a printing unit configured to print on the sheet information indicating the at least one combining method evaluated by the evaluating unit.

The evaluating unit may evaluate at least one border color appropriate for the outline of the second image in accordance with the result of the analysis performed by the analyzer. The printing unit may print on the sheet information indicating the at least one border color evaluated by the evaluating unit.

Coded information on the at least one combining method evaluated by the evaluating unit may be printed on the sheet.

The image processing apparatus may further include a reader configured to read the sheet printed by the printing unit; a comparing unit configured to perform comparison between the at least one combining method represented by the coded information and a desired combining method that are read by the reader; and a combining unit configured to combine the first image with the second image in accordance with the desired combining method when it is determined from a result of the comparison performed by the comparing unit that the at least one combining method represented by the coded information differs from the desired combining method.

The image processing apparatus may further include a reader configured to read the sheet printed by the printing unit; a comparing unit configured to perform comparison between the at least one combining method represented by the coded information and a desired combining method that are read by the reader; and a notifying unit configured to notify that the at least one combining method represented by the coded information differs from the desired combining method in accordance with a result of the comparison performed by the comparing unit.

According to another aspect of the present invention, there is provided a method for an image processing apparatus that prints a sheet provided for instructing combining of a first image with a second image. The method includes analyzing the first image; evaluating at least one combining method appropriate for the combining of the first image with the second image in accordance with a result of the analysis performed; and printing on the sheet information indicating the at least one of the evaluated combining methods.

In the evaluating, at least one border color appropriate for the outline of the second image may be evaluated in accordance with the result of the analysis. In the printing, information indicating the at least one border color evaluated may be printed on the sheet.

Coded information on the at least one combining method evaluated may be printed on the sheet.

The method may further include reading the sheet printed; performing comparison between the at least one combining method represented by the coded information and a desired combining method that are read; and combining the first image with the second image in accordance with the desired combining method when it is determined from a result of the comparison performed that the at least one combining method represented by the coded information differs from the desired combining method.

The method may further include reading the sheet printed; performing comparison between the at least one combining method represented by the coded information and a desired combining method that are read; and notifying that the at least one combining method represented by the coded information differs from the desired combining method in accordance with a result of the comparison performed.

According to yet another aspect of the present invention, there is provided a program for allowing an image processing apparatus that prints a sheet provided for instructing combining of a first image with a second image to execute processing including analyzing the first image; evaluating at least one combining method appropriate for the combining of the first image with the second image in accordance with a result of the analysis performed; and printing on the sheet information indicating the at least one combining method evaluated.

According to still another aspect of the present invention, there is provided an image processing apparatus that prints a sheet provided for instructing combining of a first image with a second image. The image processing apparatus includes an analyzer configured to analyze the first image; an evaluating unit configured to evaluate at least one border color appropriate for the outline of the second image in accordance with the result of the analysis performed by the analyzer; and a printing unit configured to print on the sheet information indicating the at least one border color evaluated by the evaluating unit.

According to another aspect of the present invention, there is provided a method for an image processing apparatus that prints a sheet provided for instructing combining of a first image with a second image. The method includes analyzing the first image; evaluating at least one border color appropriate for the outline of the second image in accordance with a result of the analysis performed; and printing on the sheet information indicating the at least one border color evaluated.

According to still another aspect of the present invention, there is provided a program for allowing an image processing apparatus that prints a sheet provided for instructing combining of a first image with a second image to execute processing including analyzing the first image; evaluating at least one border color appropriate for the outline of the second image in accordance with a result of the analysis performed; and printing on the sheet information indicating the at least one border color evaluated.

Further features of the present invention will become apparent from the following description of exemplary embodiments with reference to the attached drawings.

BRIEF DESCRIPTION OF THE DRAWINGS

FIG. 6 is a flowchart showing a process to read the combining print setting sheet and perform real printing in the first embodiment.

DESCRIPTION OF THE EMBODIMENTS

First Embodiment

Figure 1:
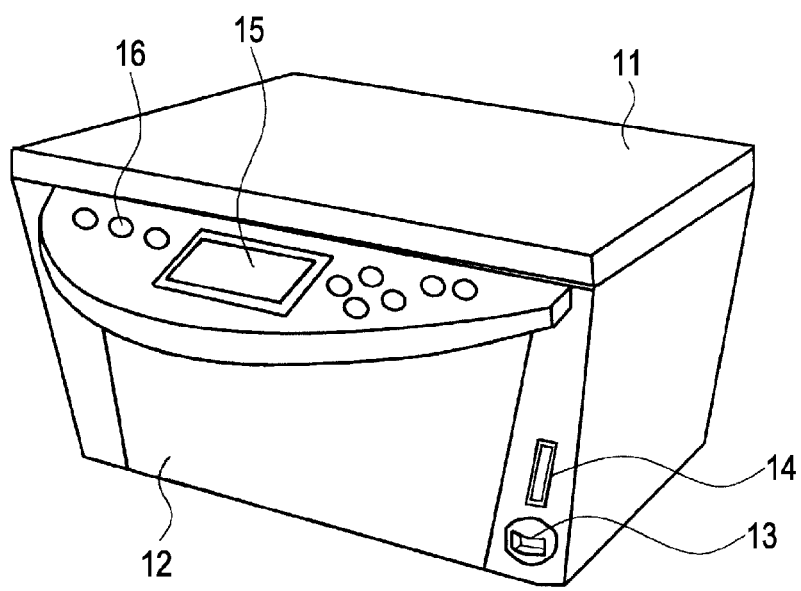
FIG. 1 is a view of an MFP apparatus according to a first embodiment of the present invention.

FIG. 1 is a view of a multifunction printer (MFP) apparatus 100 according to a first embodiment of the present invention.

The MFP apparatus 100 is an example of an image combining apparatus and has a function of a general PC printer which receives data from a host computer (PC) and performs printing. The MFP apparatus 100 also has a scan function of reading an original placed on an original document plate and a copy function of copying the original placed on the original document plate and performing printing in response to an operation instruction issued from the PC. In addition, the MFP apparatus 100 has a function of reading image data stored in a memory card and performing printing and a function of receiving image data from a digital camera and performing printing.

The MFP apparatus 100 includes an upper cover 11, a paper ejection tray 12, a connector 13, a card slot 14, a liquid-crystal display 15, and an operation unit 16.

FIG. 1 shows a state in which the upper cover 11 is closed. When the upper cover 11 is opened, an original can be placed on an original document plate (not shown). In the state shown in FIG. 1, the paper ejection tray 12 is closed. When the paper ejection tray 12 is opened for printing, the paper ejection tray 12 serves as an ejection tray for paper on which printing has been performed. When the connector 13 that allows connection with a digital camera is connected to a digital camera (not shown), image data stored in a memory of the digital camera can be read, and printing can be directly performed by the MFP apparatus 100.

The card slot 14 is used for insertion of a memory card. By inserting a memory card into the card slot 14, image data stored in the memory card can be read and printing can be performed.

When an image to be printed is selected from among a plurality of images stored in a memory card or the like, images of individual frames, index images, or the like are displayed on the liquid-crystal display 15. In addition, screens which enable settings, such as paper size, magnification, and copy density, when the MFP apparatus 100 performs copying, a screen used for an operation for a function of the maintenance of the apparatus, and the like are displayed on the liquid-crystal display 15. Moreover, a screen indicating the state of the MFP apparatus 100 when an error occurs in the MFP apparatus 100, a screen indicating the guidance of an operation when a prohibited operation is performed, and the like are displayed on the liquid-crystal display 15.

The operation unit 16 is used for operating the MFP apparatus 100. The operation unit 16 includes a plurality of operation keys, such as up, down, left, and right keys, a copy mode key, and a print start key. When one of these keys is pressed, the operation unit 16 operates the MFP apparatus 100 in conjunction with a screen displayed on the liquid-crystal display 15.

Figure 2:
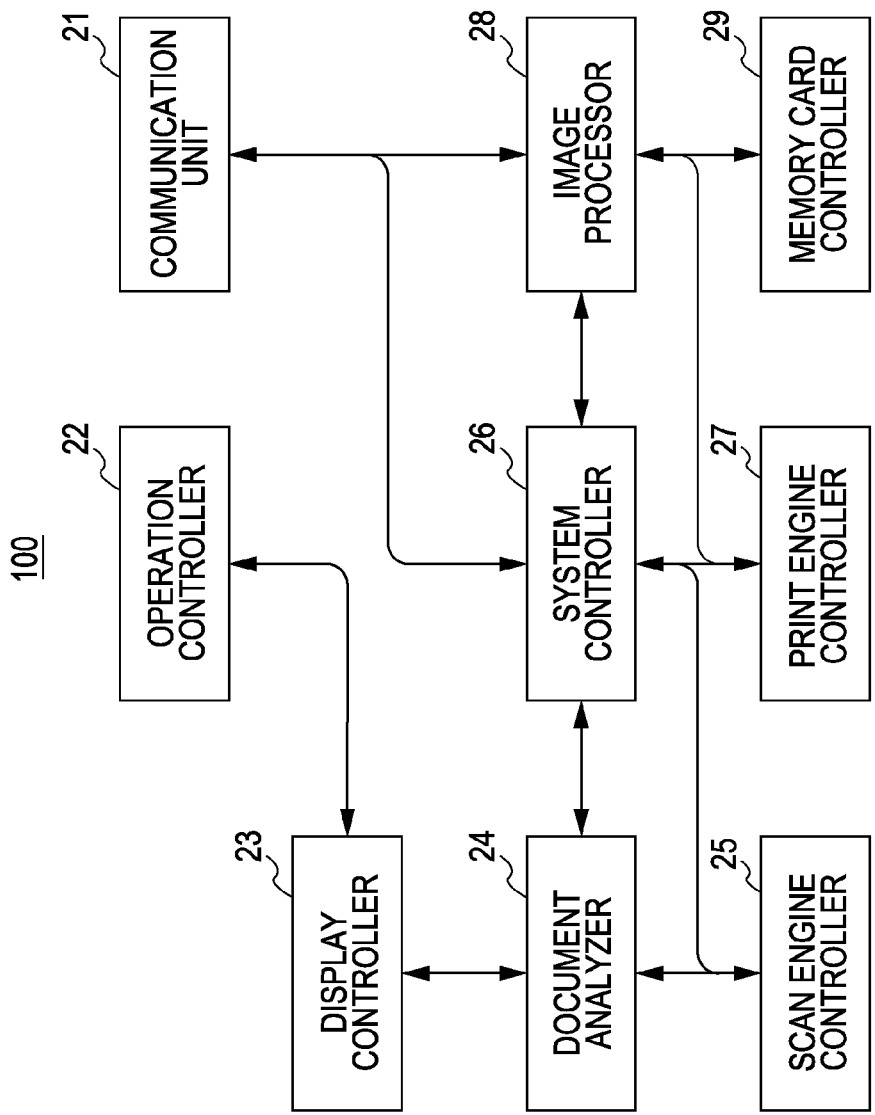
FIG. 2 is a functional block diagram showing the MFP apparatus.

FIG. 2 is a functional block diagram of the MFP apparatus 100.

The MFP apparatus 100 includes a communication unit 21, an operation controller 22, a display controller 23, and a document analyzer 24. The MFP apparatus 100 also includes a scan engine controller 25, a system controller 26, a print engine controller 27, an image processor 28, and a memory card controller 29.

The communication unit 21 controls data communication with a PC connected to a PC connector (not shown). The communication unit 21 also controls data communication with a digital camera connected to the connector 13 that allows connection with a digital camera.

The operation controller 22 detects that a key of the operation unit 16 of the MFP apparatus 100 is pressed, converts the pressing of the key into a logical key operation message, and transmits the key operation message to the display controller 23.

In response to the key operation message transmitted from the operation controller 22, the display controller 23 displays on the liquid-crystal display 15 an image to be printed, a trimming range for the selected image, and settings, such as the number of copies and the size of paper for copying.

The document analyzer 24 analyzes data that is generated by the scan engine controller 25. The document analyzer 24 reads a barcode and a mark instructed via a combining print setting sheet SH1 to generate information on print settings for photo-printing and image processing setting information, and starts photo-printing. The document analyzer 24 also reads a character handwritten or illustration hand-drawn by the user to generate combining data.

The scan engine controller 25 performs scan control to read the document and the combining print setting sheet SH1. The scan engine controller 25 is used when PC scanning is performed.

The system controller 26 performs arbitration between various controllers. The system controller 26 performs exclusive access control of a physical resource, sequence control, and state management of the MFP apparatus 100, such as various errors and the remaining ink amount.

The print engine controller 27 performs discharge control of ink droplets, control of paper feeding and paper ejection, control of a print head, and control relating to printing, such as copy printing, photo-printing, and PC printing.

The image processor 28 performs conversion of print data transmitted from the PC and transmits the converted print data to the print engine controller 27. The image processor 28 also performs decoding and trimming of an image in photo-printing. In addition, the image processor 28 performs processing of holding area information on a print layout and disposing image data in a layout position, scaling processing, color processing, binarization, and image processing, such as brightness adjustment, color saturation adjustment, and red-eye correction. The image processor 28 also performs combining processing for combining with combining data generated by the document analyzer 24.

In addition, the system controller 26 is an example of a recommended combining method setting unit configured to set a recommended combining method on the basis of a result obtained by the analyzer and an example of a color setting unit configured to set a recommended border color.

The memory card controller 29 performs reading and writing processing of an image file in the memory card inserted in the card slot 14. The memory card controller 29 also analyzes the details of image data information stored in the memory card, performs management of a directory, and assigns an image number to each piece of image data such that a unique image number is assigned to a unique piece of image data.

A procedure for performing combining printing using the combining print setting sheet SH1 in the first embodiment will be described.

Figure 3:
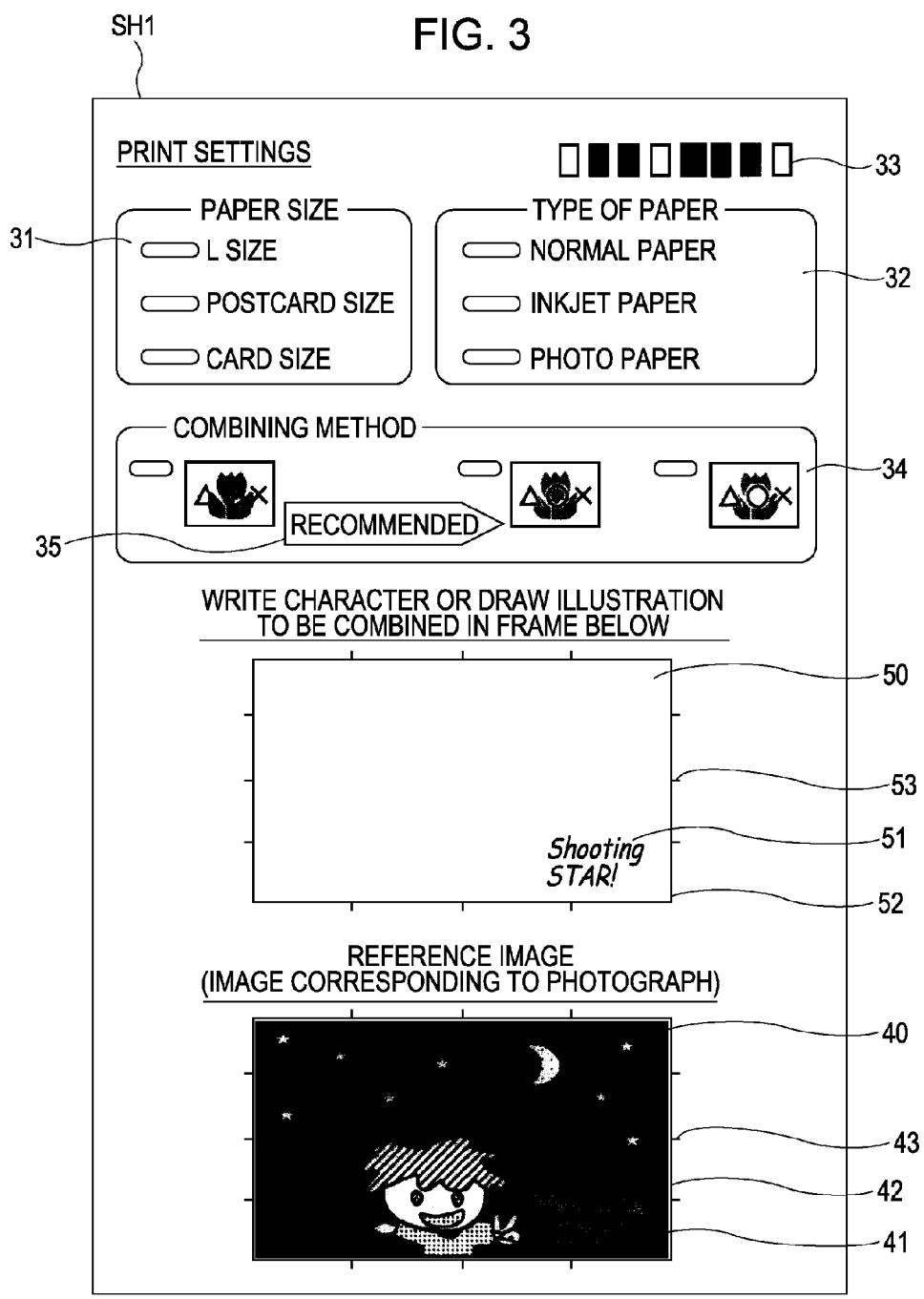
FIG. 3 shows a combining print setting sheet used in the first embodiment.

FIG. 3 shows the combining print setting sheet SH1 used in the first embodiment.

The combining print setting sheet SH1 is a setting sheet used for combining of a photograph with a handwritten or hand-drawn original. The combining print setting sheet SH1 is a sheet that allows a user to easily recognize which photograph from among a plurality of photographs stored in a memory card is referred to. Moreover, the combining print setting sheet SH1 is a sheet that allows the user to recognize at which position of the reference image the handwritten or hand-drawn original is to be combined.

The combining print setting sheet SH1 includes a paper size setting area 31, a paper type setting area 32, a barcode 33, a combining method setting area 34, a reference image area 40, and a handwriting or hand-drawing area 50. The reference image area 40 and the handwriting or hand-drawing area 50 are placed next to each other and printed next to each other.

In the reference image area 40, a reference image 41, a frame outline 42, and guide marks 43 are printed.

In the handwriting or hand-drawing area 50, a frame outline 52 and guide marks 53 are printed, and an area in which a handwritten or hand-drawn original 51 is to be written or drawn by the user is provided.

A process for printing the combining print setting sheet SH1 will be described.

Figure 4:
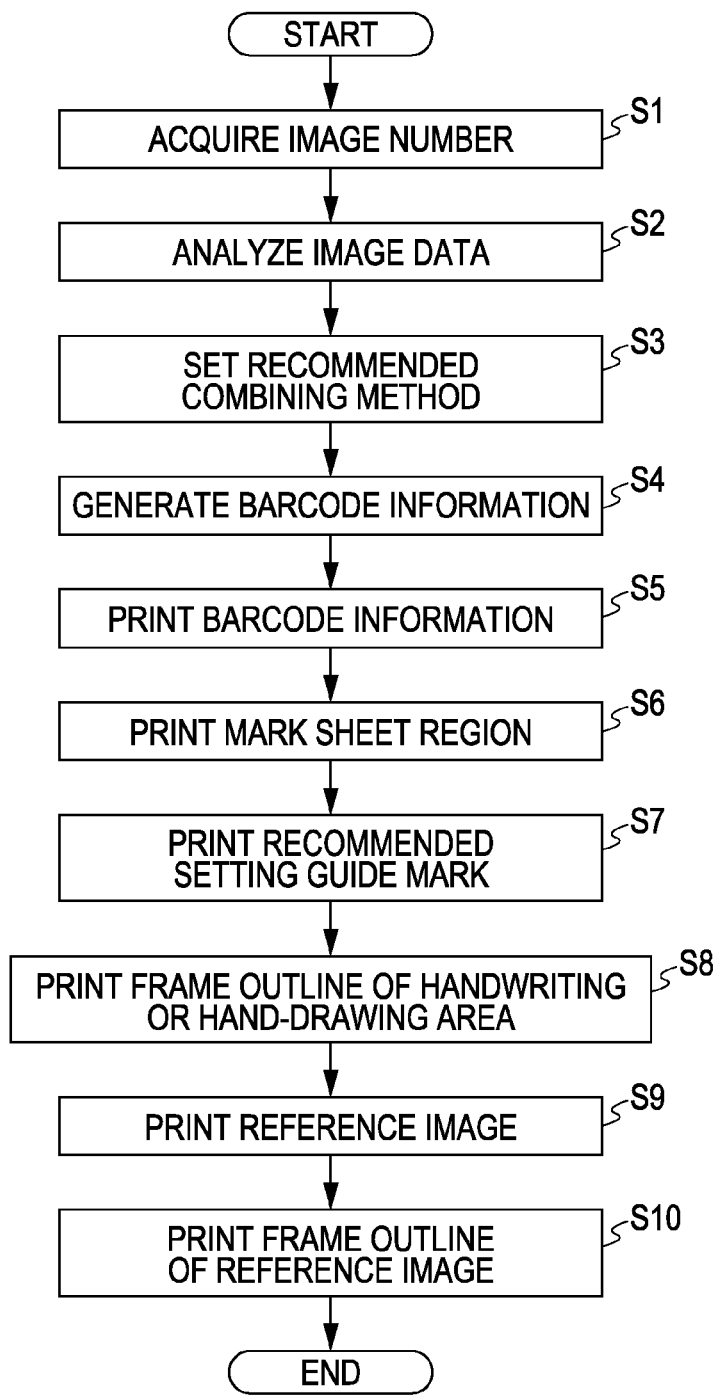
FIG. 4 is a flowchart showing a process to print the combining print setting sheet.

FIG. 4 is a flowchart showing a process to print the combining print setting sheet SH1.

The user operates the operation unit 16 while looking at the liquid-crystal display 15, selects an image to be combined, and starts printing of the combining print setting sheet SH1. For the selected image, the user is able to freely set a trimming range. In this example, the combining print setting sheet SH1 is printed on A4 size paper.

An image number of the image selected by the user is acquired (step S1), and image data corresponding to the image number is analyzed (step S2).

Figure 5A:
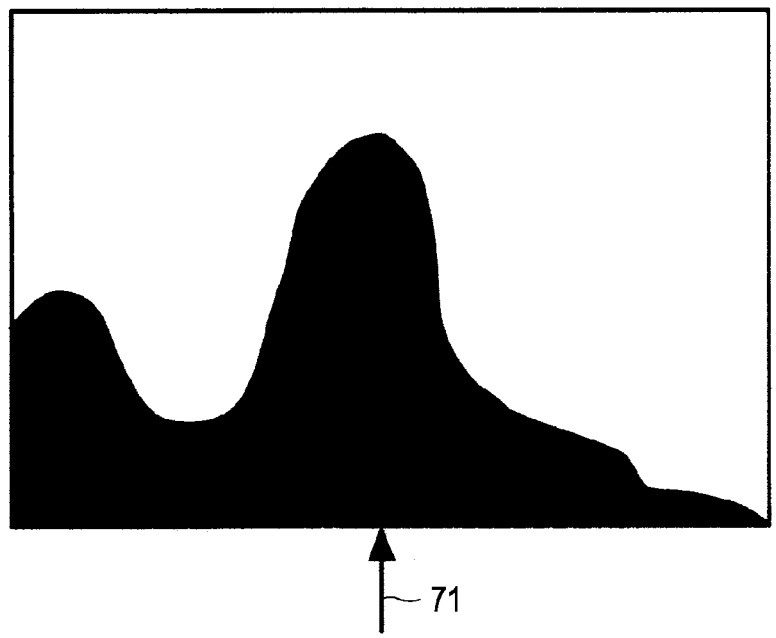
FIG. 5A shows a density histogram for the entire image data.
Figure 5B:
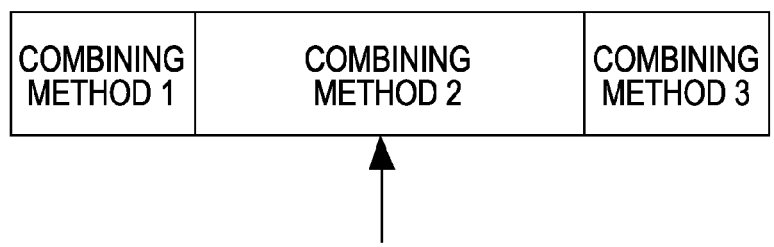
FIG. 5B shows a combining method correspondence table.

FIG. 5A is a density histogram 70 for the entire image data, and FIG. 5B shows a combining method correspondence table 72.

When image data is analyzed, the density histogram 70 for the entire image data is created, and a most probable density 71, which is the density occurring most frequently, is determined, as shown in FIG. 5A. Then, a recommended combining method is set from among a plurality of combining methods (step S3). The recommended combining method is set using the most probable density 71 obtained from the created density histogram 70.

In the combining method correspondence table 72 shown in FIG. 5B, three combining methods are provided in accordance with ranges of density. A combining method corresponding to a position referred to by the most probable density 71 is defined as a recommended combining method. A combining method 1 is a method for performing simple combining. A combining method 2 is a method for performing combining while bordering a handwritten or hand-drawn image. A combining method 3 is a method for performing combining while not only bordering a handwritten or hand-drawn image as in the combining method 2 but also filling a closed region.

In this example, referring to FIGS. 5A and 5B, the combining method 2 is defined as a combining method corresponding to the most probable density 71. Thus, the combining method 2 is set as the recommended combining method.

Barcode information including information on the image number of the photograph and trimming information is generated such that the information on the image number of the photograph and the trimming information can be referred to when real printing is performed (step S4). The barcode information generated in step S4 is printed (step S5), and a mark sheet region for providing marks for print settings is printed (step S6). In step S6, the paper size setting area 31, the paper type setting area 32, and the combining method setting area 34 are printed on the combining print setting sheet SH1.

A recommended setting guide mark 35 indicating the recommended combining method set in step S3 is printed in the combining method setting area 34 (step S7).

The frame outline 52 for indicating an area in which a handwritten character or hand-drawn illustration is to be written or drawn is printed (step S8). If data on the guide marks 53 is added in advance to data on the frame outline 52, processing for the guide marks 53 can be omitted.

The reference image 41 is printed in the reference image area 40 (step S9). When a trimming range is set, trimming processing is performed in accordance with the set trimming range. The frame outline 42 provided with the guide marks 43 that allow the user to recognize the relative position with respect to the handwriting or hand-drawing area 50 is printed outside the reference image 41 (step S10).

Concerning the printing processing performed in steps S5 to S10, generation of barcode rectangular data, decoding of image data in the memory card, color space conversion, binarization for print output, and the like are performed. The above-mentioned processing can be achieved using well-known techniques and therefore is not described further herein.

With the above-described process, the combining print setting sheet SH1 shown in FIG. 3 can be printed. On the combining print setting sheet SH1, the recommended setting guide mark 35 provided for a recommended combining method that is set from among a plurality of combining methods displayed in the combining method setting area 34 is printed. The user is able to select a combining method by referring to the recommended setting guide mark 35.

Although the paper size of the combining print setting sheet SH1 is set to A4 size in the first embodiment, the combining print setting sheet SH1 can be printed on various sizes of paper when the above-described process is performed. Even when the layout or design of the combining print setting sheet SH1 is changed, the above-described process can be applied. That is, the combining print setting sheet SH1 is not necessarily printed on A4 size paper or does not necessarily adopt the layout used in the first embodiment.

A process to read the combining print setting sheet SH1 and perform real printing in the first embodiment will be described next.

FIG. 6 is a flowchart showing the process to read the combining print setting sheet SH1 and perform real printing in the first embodiment.

After checking the mark sheet region (the paper size setting area 31, the paper type setting area 32, and the combining method setting area 34) on the combining print setting sheet SH1 and providing a handwritten character or hand-drawn illustration in the handwriting or hand-drawing area 50, the user places the combining print setting sheet SH1 on the original document plate of the MFP apparatus 100 and operates the operation unit 16 to start reading of the combining print setting sheet SH1.

The barcode 33 printed on the combining print setting sheet SH1 is read (step S21), and information on the read barcode 33 is analyzed (step S22). The information on the barcode 33 includes the "image number" and the "trimming information" printed on the combining print setting sheet SH1 in step S5.

The mark sheet region (that is, the paper size setting area 31, the paper type setting area 32, and the combining method setting area 34) provided for print settings is read (step S23). Thus, the size of paper, the type of paper, and a combining method are read. The handwritten or hand-drawn original 51 provided in the handwriting or hand-drawing area 50 is read (step S24).

Then, the read image data is analyzed to generate handwritten or hand-drawn original combining data (step S25). When the combining data of the handwritten or hand-drawn original 51 is generated, the ground of the read data and garbage data generated by noise or the like at the reading are eliminated. In addition, image processing including recognition of the position of the handwritten character or hand-drawn illustration and generation of a transparent mask pattern used for combining is performed. Since the above-mentioned image processing can be achieved using well-known techniques, it is not described further herein.

The photograph corresponding to the image number analyzed in step S22 is read from the memory card and decoding is performed (step S26). In the processing of step S26, decoding is performed for the range based on the trimming information analyzed in step S22, and only an area corresponding to the trimming range of the image data is extracted.

The image data (data of the photograph) decoded in step S26 is combined with the combining image data generated in step S25 (step S27). This combining processing is performed in accordance with the combining method read in step S23. This combining processing is performed while it is determined whether the handwritten or hand-drawn combining image data is effective or the image data of the photograph is effective through the transparent handwritten or hand-drawn combining image data by referring to a transparent mask pattern, and a border color is provided.

The data combined in step S27 is printed in accordance with the size of paper and the type of paper set on the combining print setting sheet SH1 (step S28). Image processing is also performed in step S28 as in the printing processing of the combining print setting sheet SH1.

FIGS. 7A to 7D show image combining in the first embodiment.

Figure 7A:
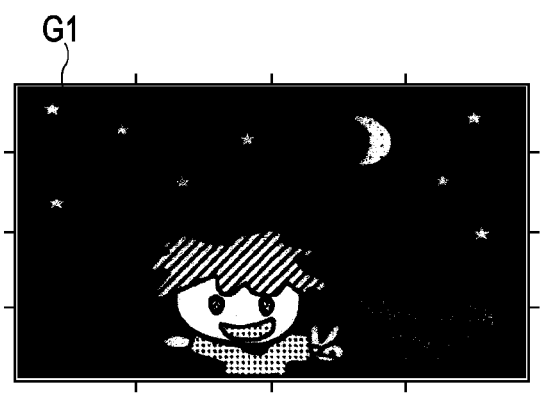
FIGS. 7A to 7D show image combining in the first embodiment.
Figure 7B:
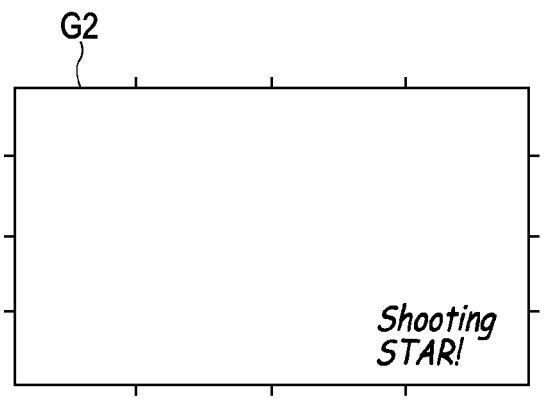
Figure 7C:
Figure 7D:
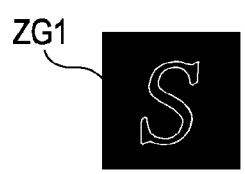

A photograph G1 shown in FIG. 7A is data of an image to be combined. A combined image SG1 shown in FIG. 7C is an image obtained by combining a handwritten or hand-drawn image G2 shown in FIG. 7B with the photograph G1 shown in FIG. 7A in accordance with the combining method set in the combining method setting area 34. An enlarged image ZG1 shown in FIG. 7D is an image obtained by enlarging part of a combined portion and shows a state in which combining is performed in accordance with the marked combining method.

Since a recommended combining method is printed on the combining print setting sheet SH1 in the first embodiment, the user is able to satisfactorily perform combining of a character or illustration handwritten or hand-drawn on the combining print setting sheet SH1 by referring to the recommended setting.

Although a combined image is printed on paper in the first embodiment, the combined image may be displayed on the display. In addition, although a set recommended setting guide mark is printed on the combining print setting sheet SH1 in the first embodiment, the set recommended setting guide mark may be displayed on the display so as to notify the user of the recommended setting. In addition, a plurality of recommended setting guide marks may be printed on the combining print setting sheet SH1.

Second Embodiment

Figure 8:
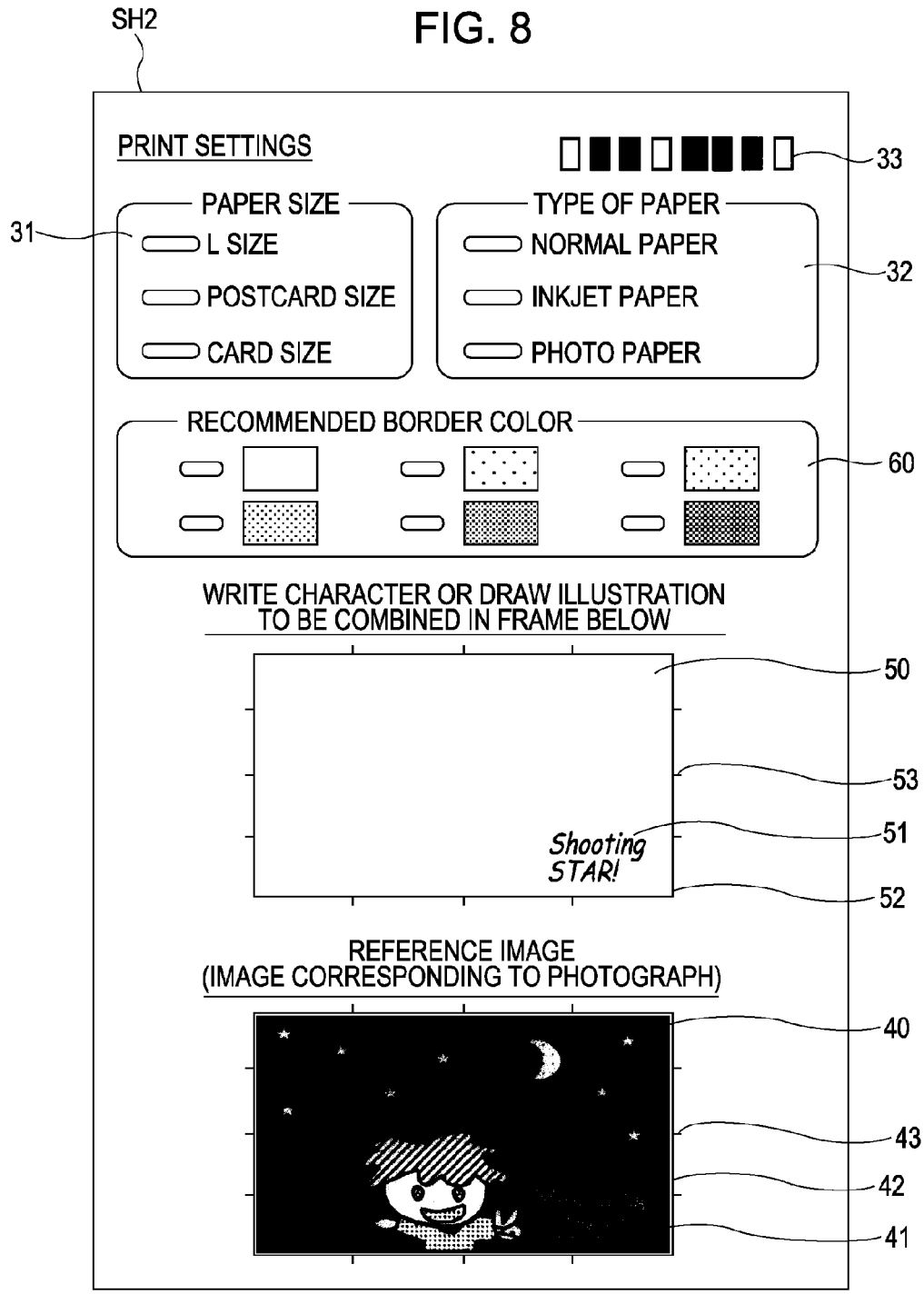
FIG. 8 shows a combining print setting sheet used by an image combining apparatus according to a second embodiment of the present invention.

FIG. 8 shows a combining print setting sheet SH2 used in an image combining apparatus according to a second embodiment of the present invention.

Since the same reference numerals as in the first embodiment have already been explained, the explanation of parts denoted by those same reference numerals will not be repeated.

The combining print setting sheet SH2 includes the paper size setting area 31, the paper type setting area 32, the barcode 33, the reference image area 40, and the handwriting or hand-drawing area 50, as in the first embodiment. The combining print setting sheet SH2 also includes a recommended border color setting area 60 in order to present recommended colors to the user when the border of the original written or drawn in the handwriting or hand-drawing area 50 is provided. Real printing is performed using a color selected by the user from among a plurality of border colors printed in the recommended border color setting area 60.

Figure 9:
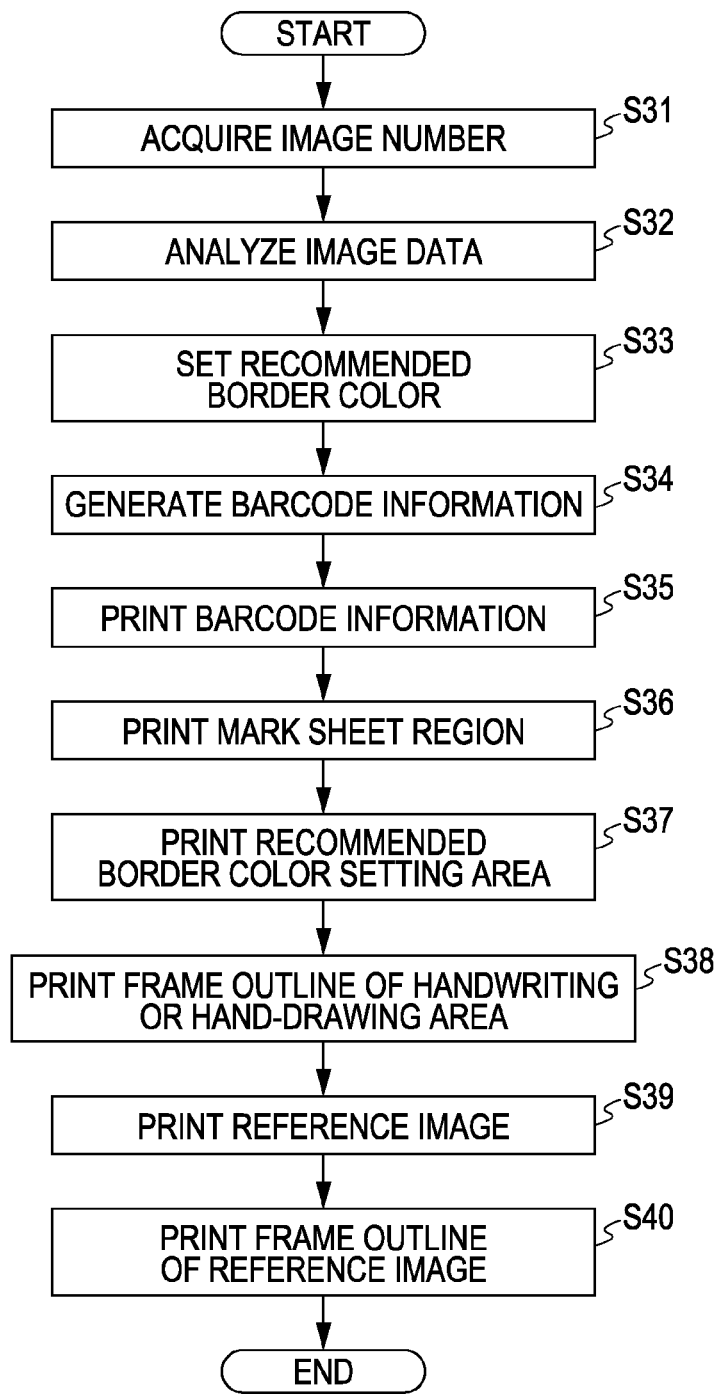
FIG. 9 is a flowchart showing a process to print the combining print setting sheet in the second embodiment.

FIG. 9 is a flowchart showing a process to print the combining print setting sheet SH2 in the second embodiment.

As in the first embodiment, the user operates the operation unit 16 to start printing of the combining print setting sheet SH2.

An image number corresponding to an image selected by the user is acquired (step S31), and image data corresponding to the image number is analyzed (step S32).

Figure 10A:
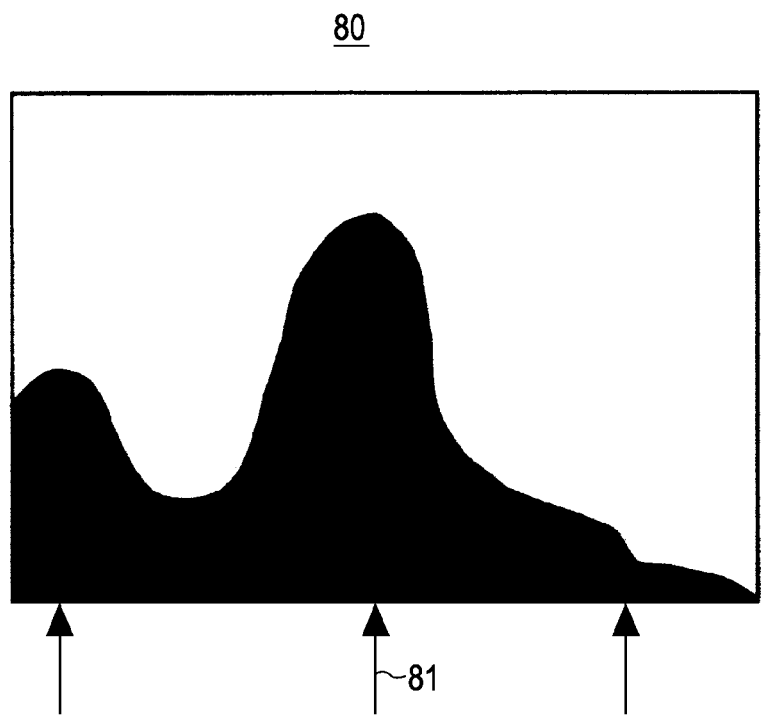
FIG. 10A shows a density histogram used in the second embodiment.
Figure 10B:
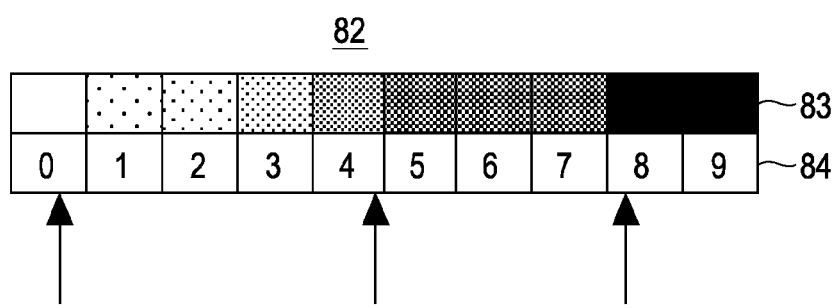
FIG. 10B shows a color reference table used in the second embodiment.

FIG. 10A shows a density histogram 80 used in the second embodiment, and FIG. 10B shows a color reference table 82 used in the second embodiment.

When image data is analyzed, as in the analysis performed in the first embodiment, a density histogram 80 for the entire image data is generated, as shown in FIG. 10A. A plurality of peak densities 81, which are peak densities frequently occurring in a close range, are determined. Then, recommended border colors are set (step S33). The recommended colors are determined on the basis of the peak densities 81 determined by the analysis of step S32 and the color reference table 82 shown in FIG. 10B. In the color reference table 82, color numbers 84 are assigned to all the border colors 83 that can be used for bordering. Colors corresponding to the peak densities 81 are selected from among the border colors 83. Here, colors close to the colors corresponding to the peak densities 81 may be set as recommended border colors. In this example, color numbers 0, 1, 4, 5, 7, and 8 are defined as recommended border colors.

Then, barcode information including information on the image number of the photograph, trimming information, and the color numbers indicating the recommended border colors is generated such that the information on the image number of the photograph, the trimming information, and the color numbers indicating the recommended border colors can be referred to when real printing is performed (step S34).

The barcode information generated in step S34 is printed (step S35), and a mark sheet region for providing marks for print settings is printed (step S36). In step S34, the paper size setting area 31 and the paper type setting area 32 are printed on the combining print setting sheet SH2.

The recommended border color setting area 60 indicating the list of the recommended border colors set in step S33 is printed (step S37). In the recommended border color setting area 60, colors corresponding to the color numbers 0, 1, 4, 5, 7, and 8 and marks for selecting respective border colors are printed next to each other.

The frame outline 52 for indicating an area in which a handwritten character or hand-drawn illustration is to be written or drawn is printed (step S38). Here, as in the first embodiment, if data on the guide marks 53 is added in advance to data on the frame outline 52, processing for the guide marks 53 can be omitted.

The reference image 41 is printed in the reference image area 40 (step S39). When a trimming range is set, trimming processing is performed in accordance with the set trimming range. The frame outline 42 provided with the guide marks 43 that allow the user to recognize the relative position with respect to the handwriting or hand-drawing area 50 is printed outside the reference image 41 (step S40).

A print process in the second embodiment can be performed similarly to the print process in the first embodiment represented by the flowchart of FIG. 6. Thus, the print process in the second embodiment will be described with reference to the flowchart of FIG. 6.

After checking the mark sheet region (that is, the paper size setting area 31, the paper type setting area 32, and the recommended border color setting area 60) on the combining print setting sheet SH2 and providing a handwritten character or hand-drawn illustration in the handwriting or hand-drawing area 50, the user places the combining print setting sheet SH2 on the original document plate of the MFP apparatus 100 and operates the operation unit 16 to start reading of the combining print setting sheet SH2.

The barcode 33 printed on the combining print setting sheet SH2 is read (step S21), and information on the read barcode 33 is analyzed (step S22). The information on the barcode 33 includes the "image number", the "trimming information", and the "color numbers" printed on the combining print setting sheet SH2 in step S35.

The mark sheet region (that is, the paper size setting area 31, the paper type setting area 32, and the recommended border color setting area 60) provided for print settings is read (step S23). Thus, the size of paper, the type of paper, and a border color are read. Since the processing of reading the handwritten or hand-drawn original 51 (step S24), the processing of generating handwritten or hand-drawn original combining data (step S25), and the processing of decoding the photograph (step S26) are the same as in the first embodiment. The explanation of the processing of steps S24, S25, and S26 will not be repeated.

The image data (data of the photograph) decoded in step S26 is combined with the combining image data generated in step S25 (step S27). This combining processing is performed while it is determined whether the handwritten or hand-drawn combining image data is effective or the image data of the photograph is effective through the transparent handwritten or hand-drawn combining image data by referring to a transparent mask pattern, and the border color is provided. The border color is determined in accordance with a color number included in the barcode information analyzed in step S22 and the color corresponding to the mark read in step S23.

The data combined in step S27 is printed in accordance with the size of paper and the type of paper set on the combining print setting sheet SH2 (step S28). With the above-described process, the selected border color is combined with the combined image SG1 shown in FIG. 7C.

In the second embodiment, a combined image is printed on paper, as in the first embodiment. However, the combined image may be displayed on the display.

In addition, in the second embodiment, a plurality of recommended border colors based on an analysis result are indicated. However, similarly to recommended setting in the first embodiment, all the border colors that can be set may be indicated and recommended guide marks may be provided to recommended border colors from among the indicated border colors. In addition, although information on a density histogram is generated on the basis of analysis of image data, analyzing information is not particularly limited. Instead of information on a density histogram, photographing information or the like corresponding to image data may be used.

In addition, a recommended combining method is indicated using the combining print setting sheet SH1 in the first embodiment and recommended border colors are indicated using the combining print setting sheet SH2 in the second embodiment. However, a recommended combining method and recommended border colors may be indicated on a single sheet.

The first embodiment is an example of a method that can be implemented in a program for causing an image combining apparatus to perform analysis processing of analyzing characteristics of a selected image and to perform combining processing of combining the selected image with a handwritten or hand-drawn original and performing a plurality of combining methods. In addition, the first embodiment is an example of a method that can be implemented in a program for causing an image combining apparatus to perform setting processing of setting a recommended combining method from among the plurality of combining methods in accordance with a result of the analysis performed by the analysis processing.

The second embodiment is an example of a method that can be implemented in a program including color setting processing of setting a recommended that causes an image combining apparatus to set at least one recommended border color in the color setting processing in accordance with the result of the analysis processing.

Third Embodiment

In a third embodiment of the present invention, a result set in the processing of step S3 for setting a recommended combining method in the process to print the combining print setting sheet SH1 used in the first embodiment is recorded in barcode information.

In the third embodiment, real printing is performed using a barcode including setting information.

Setting information on a recommended combining method can be acquired in the processing of step S22 for analyzing barcode information in the real printing process.

Figure 11A:
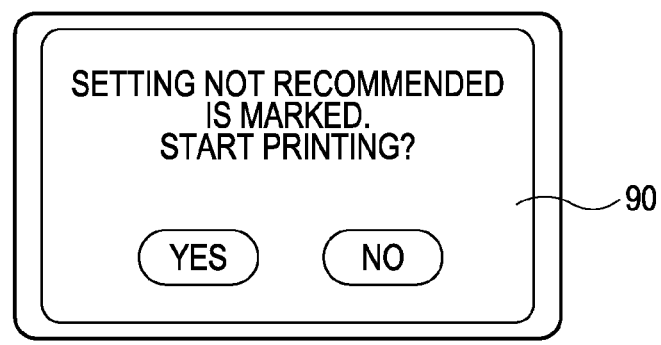
FIG. 11A shows a warning screen used in a third embodiment.
Figure 11B:
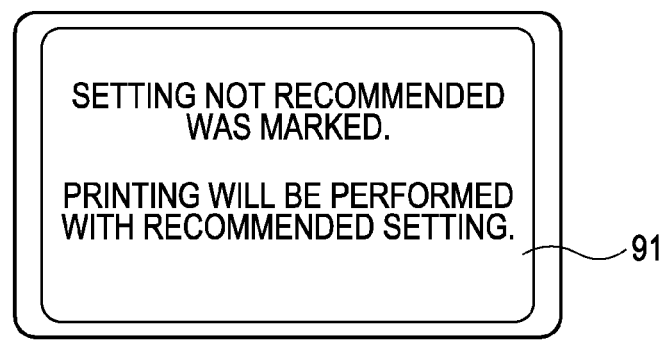
FIG. 11B shows an information screen used in the third embodiment.

FIG. 11A shows an exemplary warning screen 90 used in the third embodiment, and FIG. 11B shows an exemplary information screen 91 used in the third embodiment.

When print settings are acquired in the processing of step S23 for analyzing the mark sheet region, if a setting that is different from recommended setting is marked, the warning screen 90 is displayed on the liquid-crystal display 15, as shown in FIG. 11A. The warning screen 90 urges the user to check whether marking has been correctly performed. Thus, an unintended combined result obtained by false marking can be prevented. Alternatively, a setting that is different from recommended setting may be automatically changed. In this case, an information screen 91 such as the one shown in FIG. 11B may be displayed on the liquid-crystal display 15 so that the user is notified that the setting has been changed.

A recommended combining method and a border color for combining are presented to the user on the basis of analysis results of image data. Thus, even in a case where a color desired by the user is used for a handwritten character or hand-drawn illustration, an excellent combined result can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-200476 filed Jul. 24, 2006, which is hereby incorporated by reference herein in its entirety.

What is claimed is:

1. An image processing apparatus comprising:
    an analyzing unit configured to analyze an image selected by a user;
    a determining unit configured to determine at least one candidate of an editing process, based on analysis of the selected image performed by the analyzing unit;
    a print control unit configured to cause a printing apparatus to print on a sheet an image indicating to the user a plurality of editing processes for information to be added by the user to the sheet and the at least one candidate of the editing process determined by the determining unit from among the plurality of editing processes;
    an acquiring unit configured to acquire a read image obtained by a reading, by a reading apparatus, of the sheet printed by the print control unit;
    an extracting unit configured to extract the information which is added by the user to the sheet, from the read image acquired by the acquiring unit;
    a specifying unit configured to specify an editing process selected by the user, based on the read image;
    a combining unit configured to combine the selected image and the information edited in accordance with the editing process specified by the specifying unit, and to output a combined image of the selected image and the edited information; and
    a display control unit configured to cause a display apparatus to display, before the outputting of the combined image, an inquiring screen for inquiring of of the user whether the combined image should be output by the combining unit in a case where it is determined that the at least one candidate of the editing process is not selected by the user, based on the editing process selected by the user and specified by the specifying unit.

2. The image processing apparatus according to claim 1, wherein:
    the determining unit determines at least one candidate of a color used for editing of the information which is added by the user to the sheet based on the analysis of the selected image and the print control unit causes a printing apparatus to print an image including the at least one candidate of a color, on a sheet, and
    the specifying unit specifies a color selected by the user based on the read image.

3. The image processing apparatus according to claim 1, wherein a code indicating the at least one candidate of an editing process determined by the determining unit is printed on the sheet by the print control unit.

4. The image processing apparatus according to claim 3, further comprising:
    a comparing unit configured to perform comparison between the at least one candidate of an editing process indicated by the code included in the read image acquired by the acquiring unit, and the editing process, selected by the user, specified by the specifying unit,
    wherein the display control unit causes the display apparatus to display the inquiring screen in accordance with a result of the comparison performed by the comparing unit.

5. The image processing apparatus according to claim 3, wherein, even if the editing process selected by the user differs from the at least one candidate of an editing process indicated by the code, the combining unit combines the selected image and the information edited in accordance with the editing process selected by the user in response to an instruction by the user based on the inquiring screen displayed by the display control unit.

6. The image processing apparatus according to claim 1, wherein the combining unit outputs the combined image to the printing apparatus, and causes the printing apparatus to print the combined image.

7. The image processing apparatus according to claim 1, wherein the analyzing unit analyzes a whole of the selected image, and the determining unit determines the at least one candidate of an editing process based on the analysis of the whole of the selected image.

8. An image processing method comprising:
    analyzing an image selected by a user;
    determining at least one candidate of an editing process, based on analysis of the selected image;
    causing a printing apparatus to print on a sheet an image indicating to the user a plurality of editing processes for information to be added by the user to the sheet and the determined at least one candidate of the editing process from among the plurality of editing processes;
    acquiring a read image obtained by a reading, by a reading apparatus, of the sheet printed by the printing apparatus;
    extracting the information which is added by the user to the sheet, from the acquired image;
    specifying an editing process selected by the user, based on the read image;
    combining the selected image and the extracted information, the extracted information being edited in accordance with the specified editing process;
    outputting a combined image in which the selected image and the edited information are combined; and
    causing a display apparatus to display, before the outputting of the combined image, an inquiring screen for inquiring of the user whether the combined image should be output in a case where it is determined that the at least one candidate of the editing process is not selected by the user, based on the specified editing process selected by the user.

9. The method according to claim 8, wherein:
    at least one candidate of a color used for editing of the information which is added by the user to the sheet is determined based on the analysis of the selected image, and an image including the at least one candidate of a color is printed on a sheet by the printing apparatus, and
    a color selected by the user is specified based on the read image.

10. The method according to claim 8, wherein a code indicating the determined at least one candidate of an editing process is printed on the sheet by the printing apparatus.

11. The method according to claim 10, further comprising:
    performing comparison between the at least one candidate of an editing process indicated by the code included in the read image and the editing process selected by the user, wherein the inquiring screen is displayed by the display apparatus in accordance with a result of the comparison.

12. The method according to claim 10, wherein, if the editing process selected by the user differs from the at least one candidate of an editing process indicated by the code, the selected image and the information edited in accordance with the editing process selected by the user are combined in response to an instruction by the user based on the inquiring screen.

13. A non-transitory storage medium storing a program that causes a computer to perform a method according to claim 8.

* * * * *